United States Patent
Derohanes et al.

(10) Patent No.: US 10,856,566 B2
(45) Date of Patent: Dec. 8, 2020

(54) CO-Q10, KRILL OIL AND VITAMIN D

(71) Applicant: RB HEALTH (US) LLC, Parsippany, NJ (US)

(72) Inventors: Ed Derohanes, Salt Lake City, UT (US); Kenneth Rayl, Salt Lake City, UT (US); Michal Siwek, Salt Lake City, UT (US); John Williams, Salt Lake City, UT (US)

(73) Assignee: RB HEALTH (US) LLC, Parsippany, NJ (US)

( * ) Notice: Subject to any disclaimer, the term of this patent is extended or adjusted under 35 U.S.C. 154(b) by 0 days.

(21) Appl. No.: 15/549,063

(22) PCT Filed: Feb. 24, 2016

(86) PCT No.: PCT/GB2016/050467
§ 371 (c)(1),
(2) Date: Aug. 4, 2017

(87) PCT Pub. No.: WO2016/135482
PCT Pub. Date: Sep. 1, 2016

(65) Prior Publication Data
US 2018/0084813 A1  Mar. 29, 2018

Related U.S. Application Data

(60) Provisional application No. 62/121,786, filed on Feb. 27, 2015.

(30) Foreign Application Priority Data

Apr. 8, 2015 (GB) .................................. 1505938.9

(51) Int. Cl.
A23L 29/00 (2016.01)
A23L 29/10 (2016.01)
(Continued)

(52) U.S. Cl.
CPC ............. *A23L 33/155* (2016.08); *A23L 29/06* (2016.08); *A23L 29/10* (2016.08); *A23L 33/10* (2016.08);
(Continued)

(58) Field of Classification Search
None
See application file for complete search history.

(56) References Cited

U.S. PATENT DOCUMENTS 6,248,363 B1 * 6/2001 Patel .................... A61K 9/1617
424/497
6,403,116 B1 * 6/2002 Anderson ............ A61K 9/0095
424/400

(Continued)

FOREIGN PATENT DOCUMENTS

JP  2010285454 A  12/2010
WO  2008117062 A1  10/2008
WO  2010149815 A1  12/2010

OTHER PUBLICATIONS

International Search Report and Written Opinion issued in PCT International Application No. PCT/GB2016/050467 dated May 4, 2016.

(Continued)

*Primary Examiner* — Blaine Lankford
*Assistant Examiner* — Lauren K Van Buren
(74) *Attorney, Agent, or Firm* — Troutman Pepper Hamilton Sanders LLP; Ryan Schneider; Chris N. Davis

(57) ABSTRACT

Embodiments of the invention are related generally to compositions comprising Co-Q10, a source of omega-3 fatty acids, and vitamin D, and methods of making thereof. In particular, the invention relates to stable compositions comprising Co-Q10, krill oil, vitamin D, and an antioxidant suitable for use as dietary supplements, and methods of (Continued)

making thereof. The compositions may further comprise an emulsifier to impart stability to the compositions.

5 Claims, 2 Drawing Sheets

(51) Int. Cl.
    A23L 33/12      (2016.01)
    A23L 33/155     (2016.01)
    A23L 33/10      (2016.01)
    A23L 33/115     (2016.01)
(52) U.S. Cl.
    CPC ............. *A23L 33/115* (2016.08); *A23L 33/12* (2016.08); *A23V 2002/00* (2013.01); *A23V 2200/326* (2013.01)

(56) References Cited

U.S. PATENT DOCUMENTS

| 6,740,338 | B1 | 5/2004 | Chopra |
| 8,853,464 | B2 | 10/2014 | Ueda et al. |
| 2006/0051462 | A1 | 3/2006 | Wang |
| 2006/0153911 | A1* | 7/2006 | Ueda ................... A61K 9/4816 424/451 |
| 2008/0274203 | A1 | 11/2008 | Bruheim et al. |
| 2009/0181002 | A1 | 7/2009 | Ueda et al. |
| 2012/0141446 | A1 | 6/2012 | Patel |
| 2014/0255370 | A1* | 9/2014 | Schreuder ............... A23L 33/10 424/94.1 |
| 2015/0010520 | A1 | 1/2015 | Tan |

OTHER PUBLICATIONS

Molyneux, S. L. et al. "Coenzyme Q10—An Independent Predictor of Mortality in Chronic Heart Failure," J Am Coll Cardiol, 2008, pp. 1435-1441, 52(18), Elsevier Inc.

"Summary of Color Additives for Use in the United States in Foods, Drugs, Cosmetics, and Medical Devices," https://www.fda.gov/forindustry/coloradditives/coloradditiveinventories/ucm115641.htm, Food and Drug Administration.

* cited by examiner

CO-Q10, KRILL OIL AND VITAMIN D

FIELD OF INVENTION

The present invention relates generally to compositions comprising Co-Q10, a source of omega-3 fatty acids, and vitamin D. In particular, the invention relates to stable compositions comprising Co-Q10, krill oil, and vitamin D suitable for use as dietary supplements, and methods of making thereof.

BACKGROUND OF THE INVENTION

Coenzyme Q10, also known as ubiquinone, coenzyme Q, and Co-Q10, is a highly lipophilic, vitamin-like compound commonly present in the mitochondria of most eukaryotic cells. It is a vital component of the electron transport chain in the cell, and is essential for the generation of energy in the form of ATP. Co-Q10 is found in highest concentrations in the organs of the body with the highest energy requirements, such as the heart, kidneys, and liver. Coenzyme Q10 is a very powerful antioxidant due to its ability to exist in three distinct redox states, namely the fully oxidized (ubiquinone), the semi-oxidized (ubisemiquinone), and the fully reduced (ubiquinol, or Co-QH). Because of these properties, Co-Q10 is able to protect cells from damage caused by oxidative stress and free radicals, and is believed to be beneficial to cardiovascular health. Co-Q10 levels have been shown to be suppressed in older individuals and those with cardiovascular, neurological, liver- and diabetes-related conditions. See, e.g., Molyneux S L et al., *J Am Coll Cardiol*, 2008, Oct. 28; 52(18): 1435-41.

In human plasma, more than 90% of Co-Q10 exists in its reduced form, Co-QH. It has been reported that the ratio of ubiquinol to ubiquinone in the plasma is a biomarker for oxidative stress, indicating that people suffering from strong oxidative stress have lower levels of ubiquinol in their plasma. In fact, a decrease in ubiquinol/ubiquinone ratio has been reported in patients with adult respiratory distress syndrome, and in patients with hepatitis, cirrhosis, and hepatoma. See Yamamoto Y. et al, *Biochem Biophys Res Comm*, 1998, Jun. 9; 247(1): 166-170. Dietary supplements comprising ubiquinol may help alleviate these and other conditions.

In its fully oxidized form, Co-Q10 is prone to an irreversible transformation into its cyclic isomer, ubichromenol. This side reaction is undesirable, as it adversely affects the stability and shelf-life of Co-Q10. Adding a reducing agent to ubiquinone has been shown to convert ubiquinone to ubiquinol. See e.g., U.S. Pat. No. 8,853,464. There is a continuing need for compositions that provide a stable source of Co-Q10 suitable for use as dietary supplements. It is therefore an object of the present invention to provide such stable compositions and methods of making thereof.

Omega-3 fatty acids have long been recognized as important agents for human metabolism. They are believed to be beneficial for mental health, cognitive function, eye function, and cardiovascular health. Omega-3 fatty acids are naturally found in plant oils, such as, for example, walnut oil, flaxseed oil, and hemp oil, as well as marine animal oils, such as, for example, fish oil, cod liver oil, squid oil, and krill oil. The three types of omega-3 fatty acids involved in human physiology are alpha-Linolenic acid (ALA, found in plant oils), eicosapentaenoic acid (EPA) and docosahexaenoic acid (DHA), both commonly found in marine animal oils. Dietary supplements containing sources of omega-3 fatty acids, such as fish oil, are well-known. However, most dietary supplements that contain fish oil suffer from drawbacks, such as bulky size and unpleasant odor and/or aftertaste. There exists a continuing need for supplements that contain sources of multiple essential omega-3 fatty acids and avoid, or reduce, these drawbacks.

The vast majority of omega-3 fatty acids naturally occurring in fish oil are primarily present in a triglyceride form, in which three fatty acid molecules are bound to a three carbon glycerol backbone. Krill oil differs from fish oil in that krill oil comprises high amounts of phospholipids. See e.g., WO 2008/117062; U.S. Pub. No. 20080274203. One of the main advantages of krill oil as compared to fish oil is increased bioavailability of omega-3 fatty acids bound to a phosphate-containing moiety, the so-called "phospholipid form." Because the omega-3 fatty acids in krill oil are carried to the body's cells in phospholipid form, they are easily recognized, incorporated and utilized by the body. Importantly, because krill oil omega-3 fatty acids are carried in phospholipid form, there is no unpleasant odor or aftertaste commonly associated with fish oil.

Vitamin D refers to a group of oil-soluble compounds known as secosteroids. These compounds enhance intestinal absorption of essential minerals, such as calcium, iron, magnesium and zinc. In humans, the most important compounds in this group are vitamin D3 (also known as cholecalciferol) and vitamin D2 (ergocalciferol). Very few foods contain vitamin D; the most important natural source of vitamin D is synthesis in the skin upon exposure to sun light. It is well known that deficiencies in vitamin D can lead to osteomalacia and rickets. Vitamin D has also been recently reported to modulate inflammatory processes, endothelium and smooth muscle cell proliferation and even platelet function, thus potentially modulating atherothrombosis. It has further recently been shown that vitamin D deficiency is significantly associated with the prevalence and extent of coronary artery disease (CAD). See, e.g., Verdoia, M. et al, *Eur. J. Clin. Invest.*, 2014 July; 44(7):634-42. Thus, vitamin D is an important supplement, particularly for children, older individuals, those at risk for cardiovascular disease, and any individuals who do not have sufficient exposure to sun light.

It is therefore an object of the present invention to provide compositions suitable for use as dietary supplements by combining Co-Q10, omega-3 fatty acids and vitamin D in a single composition. It is further an object of the present invention to provide such compositions comprising these ingredients, which are well-known for their cardiovascular benefits, while maintaining good stability and shelf life of the product. It is yet another object of the present invention to provide such compositions while avoiding or reducing some of the drawbacks commonly associated with omega-3-containing dietary supplements. The foregoing discussion is presented solely to provide a better understanding of the nature of the problems confronting the art and should not be construed in any way as an admission as to prior art.

SUMMARY OF THE INVENTION

In accordance with the foregoing objectives and others, the present invention provides compositions comprising the combination of coenzyme Q-10 (Co-Q10), a source of omega-3 fatty acids, and vitamin D, and methods of making thereof. The compositions of the invention are stable and suitable for use in dietary supplements.

One aspect of the invention relates to stable compositions comprising Co-Q10, krill oil, and vitamin D. Co-Q10, in its fully oxidized form, is unstable and degrades rapidly in krill oil, thus providing challenges in producing stable formulations with good shelf life. Combining Co-Q10, krill oil, and vitamin D with an antioxidant to convert Co-Q10 to its reduced form, Co-QH, further does not result in stable Co-Q10 compositions.

It has surprisingly been found that stable compositions comprising Co-Q10, krill oil, and vitamin D can be formed when certain antioxidants (e.g., ascorbic acid) and an emulsifier (e.g., polysorbate) are added to the compositions comprising Co-Q10, krill oil, and vitamin D. The resulting compositions are surprisingly and unexpectedly stable with respect to Co-Q10. Without wishing to be bound by any theory, it is postulated that the emulsifier acts to facilitate the mixing of the antioxidant and Co-Q10, which causes Co-Q10 to be reduced to Co-QH and maintained in this reduced form, which is stable in the presence of krill oil and vitamin D.

In one embodiment, the process of the present invention combines Co-Q10, ascorbic acid, an emulsifier, and water. This mixture is then combined with a blend of krill oil, vitamin D and other ingredients, and subsequently encapsulated.

In another embodiment, the process of the present invention combines ascorbic acid, an emulsifier, and water until the ascorbic acid is fully dispersed. Co-Q10 is then added to this mixture. The mixture is then combined with a blend of krill oil, vitamin D and other ingredients, and subsequently encapsulated.

In yet another embodiment of the process according to the invention, krill oil, Co-Q10, vitamin D, an antioxidant, water, an emulsifier and other ingredients and mixed until Co-Q10 and the antioxidant are fully dispersed. The final mixture is then encapsulated.

In some embodiments of the present invention, the compositions may comprise Co-Q10 and ascorbic acid in an amount sufficient to convert at least some of Co-Q10 to its reduced form, Co-QH.

In some embodiments, the compositions may further comprise an emulsifier, e.g., polysorbate, lecithin, mono- and diglycerides of long chain fatty acids, such as saturated fatty acids, e.g., stearic and palmitic acid mono- and diglycerides in order to impart stability to the Co-Q10-containing compositions. In some embodiments, the compositions may comprise Co-Q10 and polysorbate, e.g., polysorbate 80.

In another aspect, dietary supplement compositions are provided, which comprise Co-Q10, at least one source of omega-3 fatty acids, and at least one vitamin D. In one embodiment, the compositions further comprise an antioxidant and an emulsifier. In another embodiment, the compositions comprise Co-Q10 in its reduced form, Co-QH. In yet another embodiment, the source of omega-3 fatty acids is krill oil. In yet another embodiment, the vitamin D is vitamin D3. In yet another embodiment, the antioxidant is ascorbic acid. In yet another embodiment, the emulsifier is polysorbate.

In one embodiment, dietary supplement compositions of the invention comprise Co-Q10 in an amount of about 5 mg to about 500 mg, vitamin D in an amount of about 25 IU to about 800 IU, krill oil in an amount of about 75 mg to 1.5 g, and ascorbic acid in an amount of about 1 mg to about 200 mg. In another embodiment, dietary supplement compositions of the invention further comprise polysorbate in an amount of about 10 mg to about 500 mg.

In some embodiments, the dietary supplement compositions of the invention are in a form of a capsule, tablet, powder, chewable tablet, sublingual tablet, or sublingual drop. In some embodiments, the compositions are in a capsule or a tablet form. The capsule wall-forming material may comprise, for example, gelatin or polysaccharides other than alginate. The capsules may be hard capsules, e.g., two-piece capsules, or soft capsules, e.g., softgels. In at least one embodiment, the capsule is a softgel.

BRIEF DESCRIPTION OF THE DRAWINGS

These and/or other aspects of the invention will become apparent and more readily appreciated from the following description of the embodiments, taken in conjunction with the accompanying drawings.

DETAILED DESCRIPTION OF THE INVENTION

Figure 1:
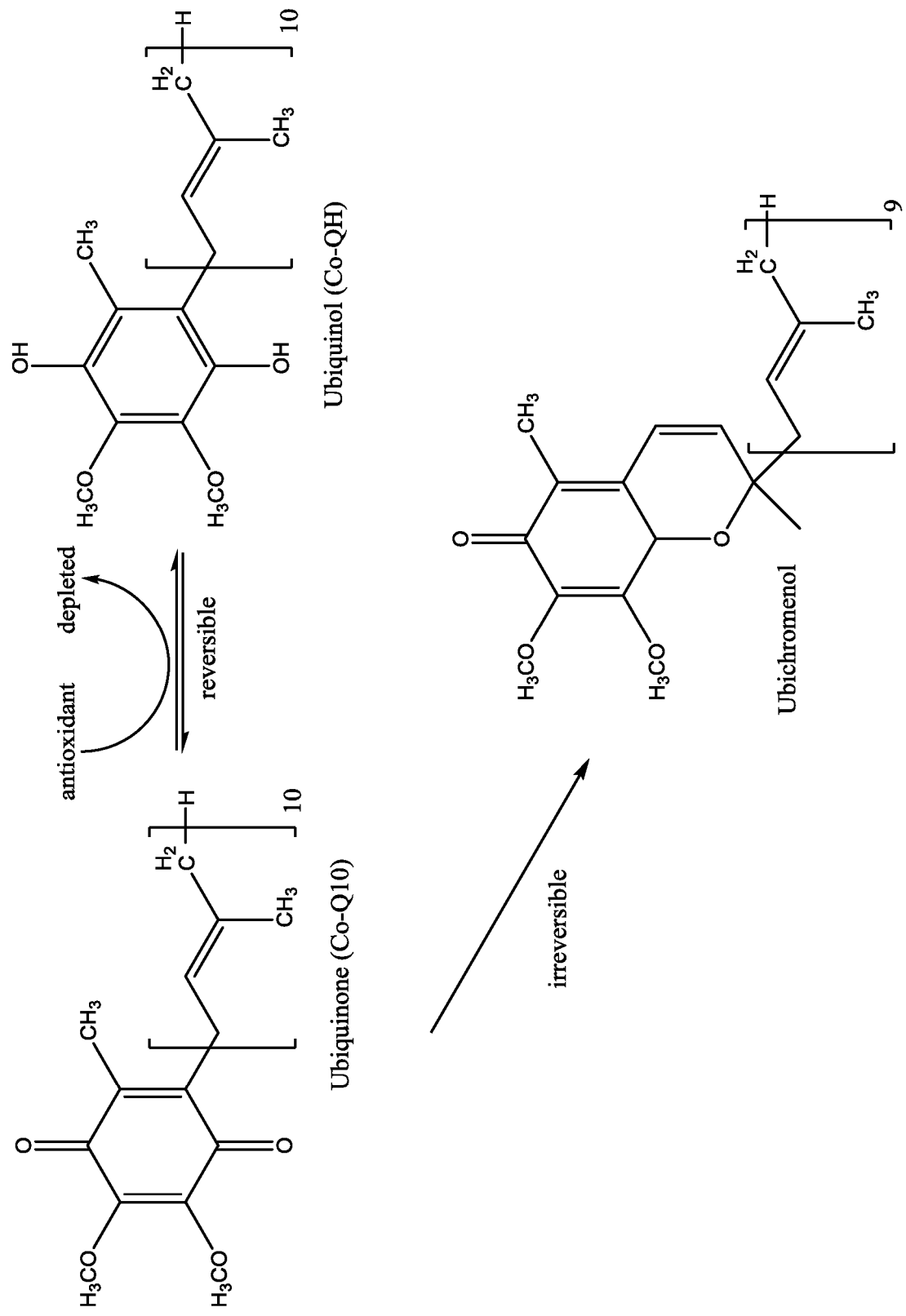
FIG. 1 depicts the reversible oxidation process of Co-Q10 to Co-QH, as well as the irreversible conversion of Co-Q10 to chromenol.

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. Therefore, specific details disclosed herein are not to be interpreted as limiting, but merely as a representative basis for teaching one skilled in the art to variously employ the present invention.

Definitions

As used herein, all terms are intended to have their ordinary meaning in the art unless specifically defined. All percentages given herein refer to the weight percentages of a particular component relative to the entire composition, unless otherwise indicated. It will be understood that the sum of all weight % of individual components within a composition will not exceed 100%.

As used herein, the term "comprising" means various components can be conjointly employed in the compositions, dietary supplements, and methods of the present invention. Accordingly, the terms "consisting essentially of" and "consisting of" are embodied in the term comprising. As used herein, the term "consisting essentially of" is intended to limit the invention to the specified materials or steps and those that do not materially affect the basic and novel characteristics of the claimed invention, as understood from reading of this specification.

Specific compounds and compositions to be used in these processes may, accordingly, be pharmaceutically acceptable. As used herein, a "pharmaceutically acceptable" component is one that is suitable for use with humans and/or animals without undue adverse side effects (such as toxicity, irritation, and allergic response) commensurate with a reasonable benefit/risk ratio. Further, as used herein, the term "safe and effective amount" refers to the quantity of a component which is sufficient to yield a desired therapeutic response without undue adverse side effects (such as toxicity, irritation, or allergic response) commensurate with a reasonable benefit/risk ratio when used in the manner of this invention. The specific "safe and effective amount" will vary with such factors as the particular condition being treated, the physical condition of the patient, the duration of the treatment, the nature of concurrent therapy (if any), and the specific formulations employed.

As used herein, the term "flavors" includes natural and artificial fruit and botanical flavors.

As used herein the term "sweeteners" includes sugars, for example, glucose, sucrose, and fructose. Sugars also include high fructose corn syrup solids, invert sugar, sugar alcohols, including sorbitol, and mixtures thereof. Artificial sweeteners are also included in the term sweetener.

As used herein, the term "antioxidant" is recognized in the art and refers to synthetic or natural substances that prevent or delay the oxidative deterioration of a compound. Exemplary antioxidants include, but are not limited to, tocopherols, flavonoids, catechins, superoxide dismutase, lecithin, gamma oryzanol; vitamins, such as vitamins A, C (ascorbic acid) and E and beta-carotene; natural components such as carnosol, carnosic acid and rosmanol found in rosemary and hawthorn extract, proanthocyanidins such as those found in grapeseed or pine bark extract, and green tea extract.

The present invention relates generally to a composition, such as a dietary supplement composition. In some embodiments, the composition is stable and includes omega-3 fatty acids, coenzyme Q10 (Co-Q10), and vitamin D. In one embodiment, the composition further includes ascorbic acid in an amount sufficient to reduce and maintain at least some of Co-Q10 in its reduced form, Co-QH. In yet another embodiment, the composition further includes an emulsifier.

In one embodiment, the dietary supplement composition comprises Co-Q10 in an amount of about 5 mg to about 500 mg, vitamin D in an amount of about 25 IU to about 800 IU, krill oil in an amount of about 75 mg to 1.5 g, and ascorbic acid an amount of about 5 mg to about 200 mg.

Coenzyme Q10

FIG. 1 depicts the reversible reduction of Co-Q10 to Co-QH in the presence of an antioxidant, as well as the irreversible conversion of Co-Q10 to ubichromenol. As stated above, in its fully oxidized form Co-Q10 is prone to an irreversible isomerization reaction to form ubichromenol. This side reaction is undesirable, as it adversely affects stability and shelf-life of Co-Q10. Adding an antioxidant to ubiquinone has been shown to effectively convert ubiquinone to stable ubiquinol and improve stability of Co-Q10. However, Co-Q10, in the oxidized form, is unstable in krill oil and vitamin D even in the presence of an antioxidant, which makes producing stable compositions comprising these ingredients a challenge.

It has surprisingly been found that stable compositions comprising Co-Q10, krill oil, and vitamin D can be formed when a specific antioxidant (e.g., ascorbic acid) and an emulsifier (e.g., polysorbate) are added to the compositions comprising Co-Q10, krill oil, and vitamin D. The resulting compositions are surprisingly and unexpectedly stable with respect to Co-Q10. Without wishing to be bound by any theory, it is postulated that the emulsifier acts to facilitate the mixing of the antioxidant and Co-Q10, which causes Co-Q10 to be reduced to Co-QH and maintained in this reduced form, which is stable in the presence of krill oil and vitamin D.

In one aspect of the invention, the composition may include an amount of Co-Q10, or Co-QH, or mixtures or derivatives thereof, e.g., esters. In another aspect of the present invention, the composition may include Co-Q10 together with an amount of an antioxidant sufficient to maintain Co-Q10 in its reduced form, Co-QH. In some embodiments, the composition may include Co-Q10 and/or Co-QH, in an amount between about 0.1 mg to 2000 mg, or about 1 mg to 1500 mg, or about 2 mg to 1000 mg, or about 3 mg to 750 mg, or about 5 mg to 500 mg, or about 10 mg to 200 mg, or about 20 mg to 150 mg, or about 50 mg to 120 mg. Furthermore, in some embodiments, the composition may include Co-Q10 in an amount from at least about 0.1%, or 1%, or 2%, or 3%, or 5%, or 7.5%, or 10%, or 15%, or 20%, or 25%, or 30%, or 40% by weight based on the total weight of the composition. For example, in specific embodiments, the composition includes Co-Q10 and/or Co-QH weighing about 50 mg to 500 mg and which comprises about 5 to 25% by weight based on the total weight of the composition.

Vitamin D

In one embodiment, the compositions of the invention include vitamin D. Vitamin D includes vitamin D, cholecalciferol (D3), ergocalciferol (D2) and its biologically active metabolites and precursors such as, $1\alpha,25\text{-}(OH)_2$ vitamin D; 25 OH vitamin D, its biological precursor; and $1\alpha$ hydroxy vitamin D, and analogues of the dihydroxy compound. Biological active vitamin D metabolites and precursors like those defined above may possess more biopotency than vitamin D2 or D3. Thus, the amount required to be safe, effective and nourishing is less and will generally comprise from about 0.25 to about 30.0 micrograms, or from about 10 IU to about 1600 IU per serving or unit dose, where an IU of vitamin D is 0.025 micrograms.

The recommended daily allowance for vitamin D ranges from about 200 IU to 600 IU depending upon age. In some embodiments, the composition of the invention may comprise a unit dosage amount of from about 25 IU to about 800 IU or from about 0.60 to 20 micrograms per serving. In some embodiments, the composition of the invention may comprise vitamin D in an amount from about 25 IU to about 1600 IU, or from about 100 IU to about 1200 IU, or from about 100 IU to about 800 IU, or from about 200 IU to about 600 IU.

Krill Oil

In one embodiment, the compositions of the invention include one or more sources of omega-3 fatty acids. In one embodiment, one source of omega-3 fatty acids is marine animal oil, such as, e.g., cod liver oil, fish oil, squid oil, or krill oil. In one particular embodiment, the source of omega-3 is krill oil.

In some embodiments of the present invention, omega-3 fatty acids are provided in the form of krill oil. In some embodiments, the composition may include krill oil in amounts between about 0.1 milligram (mg) to 5 grams (g), or between about 10 mg to 4 g, or between about 20 mg to 3 g, or between about 50 mg to 2 g, or between about 75 mg to 1.5 g, or between about 90 mg to 1 g, or between about 100 mg to 750 mg by weight of the total weight of the composition. Moreover, in some embodiments, the composition may include krill oil in an amount at least about 1%, 5%, 10%, 20%, 25%, 30%, 40%, 50%, 60%, 70%, 75%, 80%, 85%, 90%, or 95% by weight based on the total weight of the composition. In one embodiment, the composition may comprise krill oil in an amount from about 1% to about 80% by weight, or from about 10% to about 70% by weight, or from about 20% to about 60% by weight of the composition.

In some embodiments, the composition may include one or more omega-3 fatty acids in amounts between about 0.1 mg to 5 g, or between about 1 mg to 4 g, or between about 5 mg to 3 g, or between about 10 mg to 2 g, or between 15 mg to 1.5 g, or between about 20 mg to 1 g, or between about 30 mg to 750 mg, or between about 50 mg to 500 mg, or between about 50 mg to 300 mg. Moreover, in some embodiments, the composition may include one or more omega-3 fatty acids in amounts from between at least about 0.001%, 0.01%, 0.1%, 1%, 5%, 10%, 20%, 25%, or 30% by weight based on the total weight of the composition. For example, in specific embodiments, the composition includes a combination of DHA (e.g., about 10-50 mg) and EPA (e.g., about 20-100 mg) that comprises from about 0.1% to about 20% by weight based on the total weight of the composition.

Antioxidants

As stated above, in one aspect of the present invention, the composition may include Co-Q10 together with an amount of an antioxidant sufficient to reduce and/or maintain at least some Co-Q10 in its reduced form, Co-QH. In one embodiment, the antioxidant used to reduce and/or maintain Co-Q10 in its reduced form is vitamin C, or ascorbic acid. Any derivatives (e.g., ester), salts, and/or forms of ascorbic acid are contemplated as suitable for the practice of the present invention. For example, L-ascorbic acid, D-ascorbic acid, ascorbyl palmitate, gluco-ascorbic acid, arabo-ascorbic acid, etc. and mixtures thereof are all contemplated by the present invention. Ascorbic acid may comprise at least one molar equivalent to the amount of Co-Q10, or from about 0.01% to about 10% (w/w), or from about 1% to about 5% of the total weight of the composition.

Further, the compositions of the present invention may comprise additional antioxidants. Non-limiting examples of additional antioxidants that may be used in the present compositions include compounds having phenolic hydroxyl functions, such as ascorbic acid and its derivatives and/or esters; beta-carotene; eugenol; catechins; flavonoids; curcumin; tetrahydrocurcumin; ferulic acid derivatives (e.g., ethyl ferulate, sodium ferulate); gallic acid derivatives (e.g., propyl gallate); lycopene; reductic acid; tannic acid; tocopherol and its derivatives, including tocopheryl acetate; uric acid; vitamin A; natural components such as gamma oryzanol, carnosol, carnosic acid, rosmarinic acid, and rosmanol found in rosemary and hawthorn extract, proanthocyanidins such as those found in grapeseed or pine bark extract, and green tea extract; or any mixtures thereof. Other suitable antioxidants are those that have one or more thiol functions (—SH), in either reduced or non-reduced form, such as glutathione, lipoic acid, thioglycolic acid, thiourea, and other sulfhydryl compounds. Antioxidants may comprise, individually or collectively, from about 0.001% to about 20% (w/w), or from about 0.01% to about 10% of the total weight of the composition.

Emulsifiers

As stated above, in one aspect of the present invention, the composition may include Co-Q10 together with an amount of an antioxidant and an amount of an emulsifier. Any food grade emulsifier may be used. Typical edible emulsifiers include polysorbate, lecithin, mono- and diglycerides of long chain fatty acids, such as saturated fatty acids, e.g., stearic and palmitic acid mono- and diglycerides. In one embodiment of the present invention, the emulsifier is a polysorbate emulsifier, e.g., polysorbate 80 (polyoxyethylene (20) sorbitan monooleate); polysorbate 60 (polyoxyethylene (20) sorbitan monostearate); polysorbate 40 (polyoxyethylene (20) sorbitan monopalmitate); polysorbate 20 (polyoxyethylene (20) sorbitan monolaurate), or derivatives and/or mixtures thereof. In one embodiment, the emulsifier used in the compositions of the invention is polysorbate 80. In some embodiments, the emulsifier may comprise from about 0.01% to about 50% (w/w), or from about 1% to about 40%, or from about 5% to about 30% of the total weight of the composition.

Medium-Chain Triglyceride Oil

In one embodiment, the compositions of the invention comprise medium-chain triglyceride (MCT) oil. MCT oil comprises triglycerides whose fatty acid chains have between about 6 and about 12 carbon atoms. Non-limiting examples of medium-chain fatty acids that may be found in MCT oil include caproic acid (having 6 carbon atoms), caprylic acid (having 8 carbon atoms), capric acid (having 10 carbon atoms), and lauric acid (having 12 carbon atoms). Unlike regular fats which are broken down in the intestine, MCTs are absorbed intact and taken to the liver, where they are used directly for energy. As such, they are used for treating food absorption disorders, for nutritional support, as well as an aid to fat burning and weight loss. MCT oil is also used as processing aid when preparing dietary supplement compositions.

MCT oil optionally comprise at least 0.01% (w/w), or from about 0.05% to about 50% of the total weight of the composition, or from about 1% to about 40%, or from about 5% to about 30% of the total weight of the composition.

Optional Ingredients

The selection and use of suitable excipients, flavorings, sweeteners, colorants, and the like will be apparent to those skilled in the art in view of the disclosure herein. The compositions of the present invention may optionally comprise a flavor component selected from natural flavors, botanical flavors and mixtures thereof. The term "fruit flavors" refers to those flavors derived from the edible reproductive part of a seed plant, especially one having a sweet pulp associated with the seed. Also included within the term "fruit flavor" are synthetically prepared flavors made to simulate fruit flavors derived from natural sources. The term "botanical flavor" refers to flavors derived from parts of a plant other than the fruit; i.e. flavors derived from bean, nuts, bark, roots and leaves of plants. Also included within the term "botanical flavor" are synthetically prepared flavors made to simulate botanical flavors derived from natural sources. Examples of such flavors include cocoa, chocolate, vanilla, coffee, kola, tea, and the like, and derivatives thereof, e.g., ethyl vanillin. Botanical flavors can be derived from natural sources such as essential oils and extracts, or can be synthetically prepared. The particular amount of the flavor component effective for imparting flavor characteristics to the supplements of the present invention is within the skill of one in the art and depends on the flavor intensity desired, the flavor(s) selected, the flavor impression desired, and the form of the flavor component. The flavor component may comprise at least 0.0005% (w/w), or from about 0.0005% to about 5% of the total weight of the composition.

The compositions of the present invention may optionally comprise a sweetener. The sweetener composition is usually a monosaccharide or a disaccharide. These include sucrose, fructose, dextrose, maltose and lactose, but other carbohydrates can be used if less sweetness is desired. Mixtures of sugars can also be used. Other natural or artificial sweeteners can be used. These include saccharin, cyclamates, acetosulfam, L-aspartyl-L-phenylalanine lower alkyl ester sweeteners (e.g. aspartame), and the like. The amount of the sweetener effective in the compositions of the invention depends upon the particular sweetener used and the sweetness intensity desired. For noncaloric sweeteners, the amount varies depending upon the sweetness intensity of the particular sweetener and may comprise from about 0.0005% to about 10% of the total weight of the composition Coloring agents derived either from natural sources or synthetically prepared may also be included. Any coloring agents approved by the Food and Drug Administration for use in human food and/or drugs are contemplated by the present invention. For a list of exemplary coloring agents suitable for use in human food and/or drugs see, for example, Summary of Color Additives for Use in the United States in Foods, Drugs, Cosmetics, and Medical Devices published by the Food and Drug Administration.

Oral Dietary Supplement Compositions

The compositions according to the invention may be formulated in a variety of forms for administration and may comprise an effective amount of Co-Q10, a source of omega-3 fatty acids, and vitamin D, by which is meant an amount sufficient to provide health benefits to an individual in need thereof. In one embodiment, the effective amount of Co-Q10, a source of omega-3 fatty acids, and vitamin D may be sufficient to prevent, delay, slow or forestall the onset of or progression of cardiovascular disease. In other embodiments, the amount of Co-Q10, a source of omega-3 fatty acids, and vitamin D may be sufficient to provide cardiovascular benefits to an individual in need thereof when taken orally daily for a period of at least two weeks.

Any dosage forms, and combinations thereof, are contemplated by the present invention. Examples of such dosage forms include, without limitation, chewable tablets, elixirs, liquids, solutions, suspensions, emulsions, capsules, soft gelatin capsules, hard gelatin capsules, caplets, lozenges, chewable lozenges, suppositories, creams, topicals, ingestibles, injectables, infusions, health bars, confections, animal feeds, cereals, cereal coatings, and combinations thereof. The preparation of the above dosage forms are well known to persons of ordinary skill in the art.

The compositions presently disclosed may be administered orally, e.g., in the form of a hard capsule, soft capsule, softgel, tablet, two-piece shell, powder, chewable tablet, sublingual tablet, sublingual drop, sachet, lozenge, or any other form suitable for oral delivery. For example, the compositions may be in the form of a soft capsule, i.e., a gelatin, or alginate capsule, or a softgel, a hard capsule, a sachet, a lozenge, or a tablet. By way of example, the compositions may be in the form of capsules made from gelatin, such as gelatin from marine and/or mammalian sources. Examples of such gelatins may be gelatin from fish, porcine and bovine sources. Likewise the gelatin may be chosen from type A gelatin, type B gelatin and combinations thereof. An example may be gelatin comprising type A porcine gelatin (e.g., pig bone, pig skin).

The capsules and/or tablets of the present disclosure may comprise at least one coating. Such coatings may delay the release of the capsule or tablet (e.g., release of at least one Omega-3 fatty acid, or release of Co-Q10, or release of vitamin D) for a predetermined period. For example, the coating may allow the dosage form to pass through the stomach without being subjected to stomach acid or digestive juices to provide for delayed release of at least one Omega-3 fatty acid, or Co-Q10, or vitamin D outside of the stomach.

Softgel or soft gelatin capsules can be prepared, for example, without limitation, by dispersing the formulation in an appropriate vehicle (e.g., rice bran oil, monoterpene, fatty acid(s) and/or beeswax or combinations thereof) to form a high viscosity mixture. This mixture is then encapsulated with a gelatin based film using technology and machinery known to those in the softgel industry. The industrial units so formed are then polished, dried to constant weight, inspected, and packaged for commercial distribution. For example, when preparing soft gelatin shells, the shell can include between about 20 to 70 percent gelatin, generally a plasticizer and about 5 to about 60% by weight sorbitol. The filling of the soft gelatin capsule is liquid and can include, apart from a source of Omega-3 fatty acids, Co-Q10, and vitamin actives, a hydrophilic matrix. The hydrophilic matrix, if present, is a polyethylene glycol having an average molecular weight of from about 200 to 1000. Further ingredients are optionally thickening agents. In one embodiment, the hydrophilic matrix includes polyethylene glycol having an average molecular weight of from about 200 to 1000, 5 to 15% glycerol, and 5 to 15% by weight of water. The polyethylene glycol can also be mixed with propylene glycol and/or propylene carbonate.

As for the manufacturing, it is contemplated that standard soft shell gelatin capsule manufacturing techniques, known as "encapsulation," can be used to prepare the softgel product. Examples of useful manufacturing techniques are the plate process, the rotary die process pioneered by R. P. Scherer, the process using the Norton capsule machine, and the Accogel machine and process developed by Lederle. Each of these processes is mature technologies that are widely available to anyone wishing to prepare soft gelatin capsules.

Typically, when a soft gel capsule is prepared, the total weight is between about 250 milligrams and about 2.5 gram in weight, e.g., about 500-2,000 milligrams, or 500-1,000 milligrams, or 750-1200 milligrams, or 1500-2,000 milligrams. Therefore, the total weight of additives is between about 80 milligrams and about 2000 milligrams, alternatively, between about 100 milligrams and about 1500 milligrams, and in particular between about 120 milligrams and about 1200 milligrams. In particular, the soft gel capsule typically weighs between about 1000 milligrams and 1300 milligrams, wherein the percentage fill is about 50% of the entire weight of the capsule, i.e., from about 500 mg to about 1 g fill weight. The fill weight includes the active ingredients, solubilizing agents, optional ingredients, etc.

Process of Making Stable Compositions

It has surprisingly been found that stable compositions comprising Co-Q10, krill oil, and vitamin D can be formed when a certain antioxidant (e.g., ascorbic acid) and an emulsifier (e.g., polysorbate) are added to the compositions comprising Co-Q10, krill oil, and vitamin D. The resulting compositions are surprisingly and unexpectedly stable with respect to Co-Q10.

Figure 2:
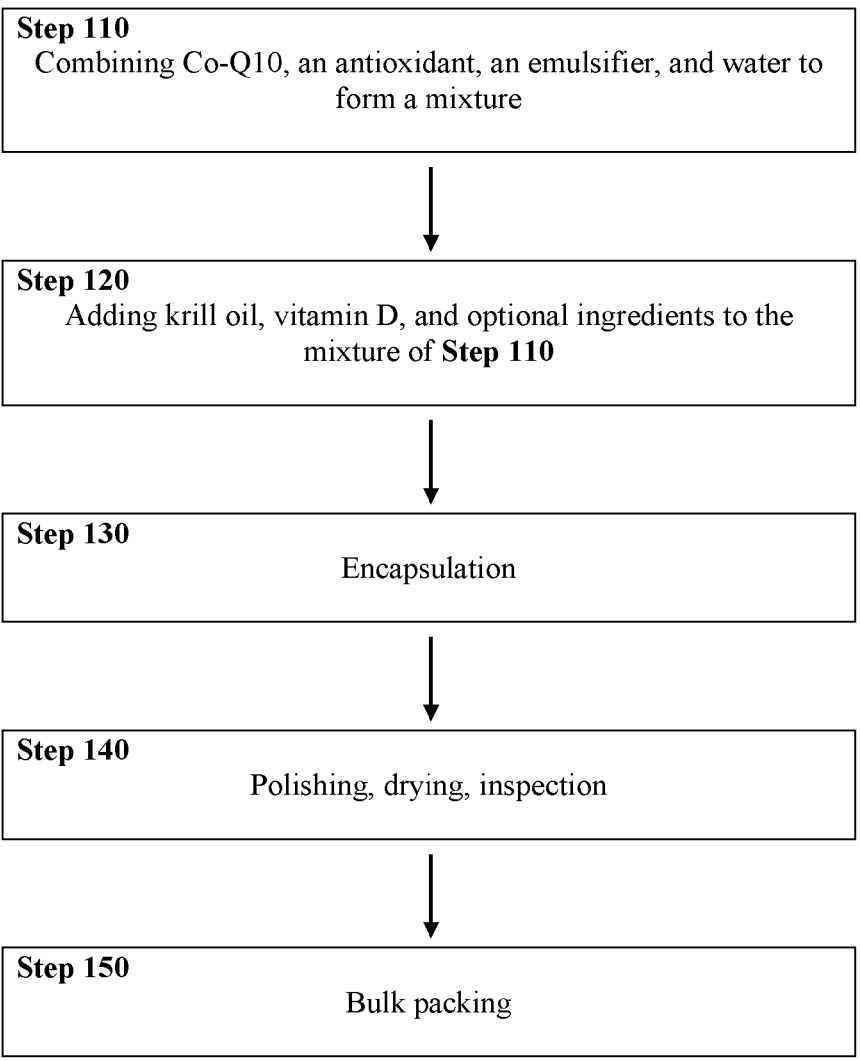
FIG. 2 is a flow chart of an exemplary process of making compositions in accordance with an embodiment of the invention.

FIG. 2 depicts an exemplary process of making compositions in accordance with an embodiment of the present invention. In this exemplary embodiment, Step 110 combines Co-Q10, an antioxidant (e.g., ascorbic acid), an emulsifier (e.g., polysorbate), and water to form a mixture, e.g., a paste. In the next step, Step 120, krill oil, vitamin D, and optional ingredients are added to the mixture of Step 110. The thus combined ingredients are subsequently encapsulated (Step 130); polished, dried and inspected (Step 140), and packaged for commercial distribution (Step 150).

In another embodiment, the process of the present invention combines an antioxidant, an emulsifier, and water until the antioxidant is fully dispersed. Co-Q10 is then added to this mixture. The mixture is then combined with a blend of krill oil, vitamin D and other ingredients, and subsequently encapsulated.

In another embodiment of the process according to the invention, krill oil, vitamin D, an antioxidant and other ingredients are mixed until the antioxidant is fully dispersed. CoQ10, an emulsifier, and water are then combined with the above mixture until fully dispersed. The final mixture is subsequently encapsulated.

In yet another embodiment of the process according to the invention, krill oil, Co-Q10, vitamin D, an antioxidant, water, an emulsifier and other ingredients and mixed until Co-Q10 and the antioxidant are fully dispersed. The final mixture is then encapsulated.

The compositions prepared according to a process of the present invention exhibit good stability with respect to all ingredients. The compositions prepared as such are suitable for use as stable dietary supplements with good stability and shelf-life.

The present invention also provides packaged formulations and instructions for use of the tablet, capsule, elixir, etc. Typically, the packaged formulation, in whatever form, is administered to an individual in need thereof that requires an increase in the amount of Co-Q10, vitamin D, and/or omega-3 fatty acids in the individual's diet. Typically, the dosage requirement is between about 1 to about 4 dosages a day.

EXAMPLES

The following examples describe specific aspects of the invention to illustrate the invention but should not be construed as limiting the invention, as the examples merely provide specific methodology useful in the understanding and practice of the invention and its various aspects.

Example 1: Stability of Co-Q10 and Co-QH in Krill Oil

Two formulations comprising Co-Q10 (Study I) and Co-QH (Study II) were evaluated for stability in krill oil and Vitamin D mixtures. The compositions were subjected to accelerated conditions (40° C., 75% relative humidity for up to 12 weeks), and the amounts of Co-Q10, Co-QH, and ubichromenol were evaluated at several time points. The results are summarized in Table 1.

TABLE 1

Stability of Co-Q10 and Co-QH in Krill Oil

| Study | Analyte | Initial | 4 weeks | 8 weeks | 12 weeks |
|---|---|---|---|---|---|
| I | Co-Q10 (mg) | 112 | 82 | 58 | 45 |
|  | Ubichromenol (mg) | 11 | 40 | 50 | 59 |
|  | Sum | 122 | 122 | 108 | 104 |
| II | Co-QH (mg) | 141 | 134 | 139 | 138 |
|  | Co-Q10 (mg) | 1.5 | 0.8 | 0.8 | 1.0 |
|  | Sum | 142 | 138 | 140 | 139 |

As can be seen from the data in Table 1, Co-Q10 is unstable in krill oil and Vitamin D, and degrades very significantly over the 12-week period. As the data of Study I show, the primary product of decomposition of Co-Q10 is ubichromenol. As can be further seen from the Study II data in Table 1, Co-QH is stable in krill oil and Vitamin D over the 12-week period.

Example 2: Antioxidant Study

Several antioxidants were evaluated for their ability to stabilize Co-Q10 in krill oil and Vitamin D. The results are summarized in Table 2.

TABLE 2

Influence of Antioxidant on Co-Q10 Stability

| | Amount of Co-Q10, mg | | |
|---|---|---|---|
| Antioxidant | Initial | 1 week | 2 weeks |
| None (control) | 133 | 12 | 10 |
| Eugenol | 142 | 48 | 25 |
| Thiourea | 155 | 145 | 109 |
| Ascorbic Acid | 139 | 133 | 129 |
| Ascorbic Acid plus emulsifiers | 142 | 136 | 128 |

As shown in Table 2, Co-Q10 degrades rapidly in krill oil and Vitamin D, even in the presence of eugenol and thiourea. However, as further shown in Table 2, ascorbic acid is able to stabilize Co-Q10 in krill oil and Vitamin D.

The results shown in Table 2 were confirmed by two additional experiments, the results of which are summarized in Tables 3 and 4.

TABLE 3

Influence of Antioxidant Dosing on Co-Q10 Stability

| | Amount of Co-Q10, mg | | |
|---|---|---|---|
| Antioxidant | Initial | 1 week | 2 weeks |
| Eugenol - low dose | 142 | 16 | 14 |
| Eugenol - medium dose | 146 | 23 | 16 |
| Eugenol - high dose | 146 | 43 | 26 |
| Ascorbic Acid - low dose | 137 | 91 | 71 |
| Ascorbic Acid - medium dose | 145 | 136 | 138 |
| Ascorbic Acid - high dose | 109 | 100 | 100 |

TABLE 4

Influence of Chelating Agent on Co-Q10 Stability

| | Amount of Co-Q10, mg | | |
|---|---|---|---|
| Chelating Agent | Initial | 1 week | 2 weeks |
| EDTA | 125 | 10 | 0 |
| Peracetic acid (PAA) | 137 | 10 | 0 |
| Ascorbic Acid/EDTA | 142 | 136 | 128 |

As shown in Table 3, ascorbic acid at medium dose shows consistent ability to stabilize Co-Q10 in krill oil and Vitamin D. Further, as shown in Table 4, the combination of ascorbic acid and EDTA stabilizes Co-Q10 in krill oil and Vitamin D, as compared to EDTA or PAA alone.

Example 3: Formulations

The compositions of the invention were prepared according to the following formulations. Table 5 depicts a range of ingredients in successful formulations according to the present invention. All percentages given herein refer to the weight percentages of an ingredient relative to the entire composition. The sum of all weight % of individual components within a composition will not exceed 100%.

TABLE 5

Range of Ingredients

| Ingredient | Min (%) | Max (%) |
|---|---|---|
| Krill Oil | 41.31 | 53.70 |
| Co-Q10 | 16.27 | 21.35 |
| Polysorbate 80 | 8.57 | 19.89 |
| Ascorbic acid | 3.79 | 4.98 |
| vitamin D | 0.07 | 0.11 |
| Water | 0.0002 | 0.0004 |
| EDTA | 0.0000 | 0.0115 |
| MCT oil | 0.00 | 23.59 |

An exemplary composition comprising Co-Q10, krill oil, and vitamin D according to the present invention is provided in Table 6. Krill oil was purchased from Aker BioMarine. Polysorbate 80 used was Tween® 80 from Sigma-Aldrich. The concentration of liquid vitamin D (cholecalciferol) was 1 million IU/g.

TABLE 6

Exemplary Composition

| Ingredient | Amount (mg) |
|---|---|
| Krill Oil | 303.000 |
| Co-Q10 | 117.000 |
| Vitamin D (1 MM IU/g) | 0.600 |
| Polysorbate 80 | 109.046 |
| Ascorbic acid | 27.264 |
| Water | 0.002 |
| MCT oil | 162.000 |
| Total Fill | 718.912 |

Example 4: Stability Studies

Stability studies were performed to assess how the stability of active ingredients in the product varies over time under the influence of temperature and humidity in the proposed commercial packaging—bottle (no carton box). Two separate studies were performed on bottles of 40 and 20 softgels ("40-count and 20-count bottle studies"). Softgels prepared according to the formulation of Example 3, Table 4 were subjected to accelerated conditions (40° C., 75% relative humidity for up to 12 weeks), and the amounts of active ingredients were evaluated at several time points.

The amounts of Co-Q10 were determined by high-performance liquid chromatography (HPLC) using 4.6 mm×50 mm 3μ. Inertsil ODS-3 HPLC Column or equivalent at ambient temperature and 1.0 mL/min flow rate. The amounts of vitamin D3 (Cholecalciferol) were determined by HPLC using SpheriSorb, NH2 160×4.6 mm, 3 μm HPLC column, or equivalent at ambient temperature and 1.3 mL/min flow rate. The amounts of DHA, EPA, and total omega-3 fatty acids in the formulations were determined by acid-catalyzed methylation of the acids to the corresponding fatty acid methyl esters (FAMEs) followed by quantitation by Gas Chromatography (GC). The GC column used was Restek RT-2560 capillary column, 100 m, 0.25 mm ID, 0.2 μdf. The carrier gas was Helium at 1.2 mL/min constant flow rate. The amounts of phospholipids were determined by nuclear magnetic resonance (NMR).

The results of the stability studies are summarized in Tables 7 and 8:

TABLE 7

40-Count Bottle Study

| Test | Spec | Initial | 4 weeks | 8 weeks | 10 weeks | 12 weeks |
|---|---|---|---|---|---|---|
| Active Ingredient | | | | | | |
| DHA (mg) | Min amount 21 Target amount 26 | 21.9 | 22.1 | 21.6 | 21 | 22.6 |
| EPA (mg) | Min amount 33 Target amount 42 | 43 | 46 | 45 | 45 | 45 |
| Omega-3 (mg) | Min amount 65 Target amount 81 | 88 | 91 | 88 | 89 | 89 |
| Phospholipids (mg) | Min amount 104 Target amount 130 | 123 | 121 | 119 | 115 | 118 |
| Co-Q10 (mg) | Min amount 100 Target amount 115 | 116 | 117 | 119 | 119 | 119 |
| Cholecalciferol - vitamin D (IU) | Min amount 480 Target amount 600 | 608 | 644 | 614 | 602 | 589 |

TABLE 8

20-Count Bottle Study

| Test | Spec | Initial | 4 weeks | 8 weeks | 12 weeks |
|---|---|---|---|---|---|
| Active Ingredient | | | | | |
| DHA (mg) | Min 21 Target 26 | 21.9 | 22.5 | 21.7 | 21.9 |
| EPA (mg) | Min 33 Target 42 | 43 | 46 | 45 | 44 |
| Omega-3 (mg) | Min 65 Target 81 | 88 | 90 | 88 | 91 |
| Phospholipids (mg) | Min 104 Target 130 | 124 | 122 | 120 | 114 |
| Co-Q10 (mg) | Min 100 Target 115 | 116 | 117 | 120 | 121 |
| Cholecalciferol- vitamin D3 (IU) | Min 480 Target 600 | 608 | 626 | 628 | 667 |

Tables 7 and 8 show that all active ingredients, including total omega-3 fatty acids, DHA, EPA, Phospholipids, Co-Q10, and vitamin D3, were stable for 12 weeks at accelerated conditions (40° C., 75% relative humidity). This indicates that the compositions are stable and provide a stable shelf life with respect to all active ingredients.

All references including patent applications and publications cited herein are incorporated herein by reference in their entirety and for all purposes to the same extent as if each individual publication or patent or patent application was specifically and individually indicated to be incorporated by reference in its entirety for all purposes. Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A dietary supplement composition consisting of:
   Co-Q10 in an amount of at least about 5% to about 40% by weight based on the total weight of the composition;
   about 25 IU to about 800 IU of vitamin D3;
   krill oil in an amount of at least about 20% to about 90% by weight based on the total weight of the composition;
   an antioxidant;
   an emulsifier; and
   one or more of a second vitamin, a flavoring agent, a coloring agent, and a sweetener,
   wherein the antioxidant is ascorbic acid present in an amount sufficient to convert at least a portion of the amount of Co-Q10 to Co-QH,
   wherein the emulsifier is polysorbate, and
   wherein the composition is stable for at least four weeks at 40° C. and 75% relative humidity.

2. The composition of claim 1 prepared by a process comprising:
   combining the Co-Q10, the antioxidant, the emulsifier, and to form a first mixture;
   combining the vitamin D and the krill oil to form a second mixture;
   combining the first mixture with the second mixture to form a third mixture; and
   encapsulating the third mixture.

3. The composition of claim 1, wherein the composition is in a form selected from the group consisting of a capsule, tablet, powder, chewable tablet, sublingual tablet, and sublingual drop.

4. The composition of claim 1, wherein the composition is in the form of a capsule; and
   wherein the capsule is a softgel.

5. The composition of claim 1, wherein the flavoring agent comprises ethyl vanillin.

* * * * *